United States Patent
Koukan et al.

(10) Patent No.: US 10,190,458 B2
(45) Date of Patent: Jan. 29, 2019

(54) STORAGE TANK FOR AQUEOUS UREA SOLUTION IN A MOTOR VEHICLE

(71) Applicant: KAUTEX TEXTRON GMBH & CO., KG, Bonn (DE)

(72) Inventors: Ibrahim Koukan, Cologne (DE);
Holger Luehn, St. Augustin (DE);
Nicolai Schumacher, Bonn (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 85 days.

(21) Appl. No.: 15/314,503

(22) PCT Filed: May 27, 2015

(86) PCT No.: PCT/EP2015/061671
§ 371 (c)(1),
(2) Date: Nov. 28, 2016

(87) PCT Pub. No.: WO2015/181215
PCT Pub. Date: Dec. 3, 2015

(65) Prior Publication Data
US 2017/0184000 A1    Jun. 29, 2017

(30) Foreign Application Priority Data
May 28, 2014  (DE) .......................... 10 2014 007 706

(51) Int. Cl.
*F01N 3/00*    (2006.01)
*F01N 3/20*    (2006.01)
(Continued)

(52) U.S. Cl.
CPC ............ *F01N 3/2066* (2013.01); *B60K 13/04* (2013.01); *B67D 7/0288* (2013.01); *B67D 7/36* (2013.01);
(Continued)

(58) Field of Classification Search
USPC .................. 60/274, 286, 295, 297, 301, 303
See application file for complete search history.

(56) References Cited

U.S. PATENT DOCUMENTS 8,807,162 B2 *   8/2014   Monterrey ............. B63H 21/38
                                                  137/202
8,967,181 B2 *   3/2015   Wetzel ............. B60K 15/03519
                                                  137/202
(Continued)

FOREIGN PATENT DOCUMENTS

CA        2639994       8/2007
DE     202012012347     2/2013
(Continued)

OTHER PUBLICATIONS

"ISO 22241-5, 2012, Diesel engines—N0x reduction agent AUS 32—refilling interface for passenger cars", International Standard Organisation, Geneva.
(Continued)

*Primary Examiner* — Binh Q Tran
(74) *Attorney, Agent, or Firm* — Grossman, Tucker, Perreault & Pfleger, PLLC

(57) ABSTRACT

The invention relates to a storage tank (1) in a motor vehicle for receiving an aqueous urea solution for the SCR of nitrogen oxide in the exhaust gas. The storage tank (1) comprises a tank body which forms a storage volume (2) for the urea solution. The storage tank (1) furthermore comprises a filling pipe for filling the storage volume (2) and means for venting the storage volume (2) during the refuelling, wherein the filling pipe (3) has a filling head (9) at a remote end, and the filling head (9) forms an orifice stub (10). The orifice stub (10) defines an orifice (11) for receiving a fuel pump nozzle. Said orifice stub furthermore has an external thread for receiving a complementary union thread of a refuelling cylinder for refuelling by the gas displace-
(Continued)

Figure 2A:
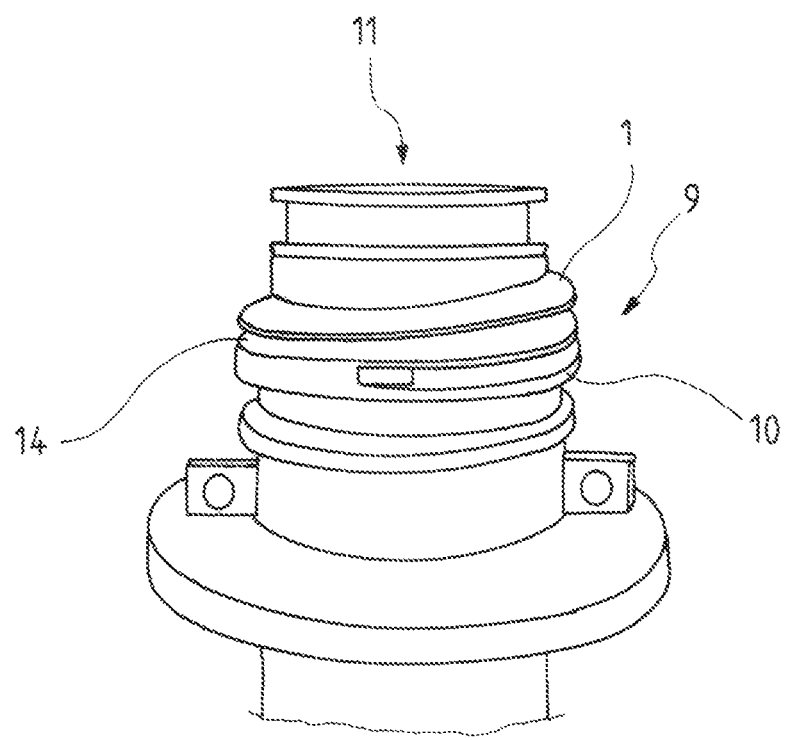

ment method. The orifice stub forms at least one secondary air opening when the refuelling cylinder is attached, and therefore, when a refuelling cylinder is attached, a sealing seat is bridged by the refuelling cylinder and refuelling by the gas displacement method is possible even if counterflow venting through the filling tube (3) does not take place.

12 Claims, 7 Drawing Sheets

(51) Int. Cl.
*B60K 13/04* (2006.01)
*B67D 7/02* (2010.01)
*B67D 7/36* (2010.01)
*B60K 15/03* (2006.01)
*B60K 15/035* (2006.01)

(52) U.S. Cl.
CPC .......... *B60K 15/03519* (2013.01); *B60K 2015/03289* (2013.01); *B60K 2015/03538* (2013.01); *F01N 2610/02* (2013.01); *F01N 2610/1406* (2013.01); *F01N 2610/1413* (2013.01); *Y02A 50/2325* (2018.01); *Y02T 10/24* (2013.01)

(56) References Cited

U.S. PATENT DOCUMENTS

| | | | |
|---|---|---|---|
| 9,644,518 B2* | 5/2017 | Ham | B67D 7/0294 |
| 9,874,127 B2* | 1/2018 | Ryoo | F01N 3/2066 |
| 2010/0224284 A1* | 9/2010 | Kolberg | F01N 3/2066 |
| | | | 141/325 |
| 2016/0263989 A1 | 9/2016 | Koukan et al. | |

FOREIGN PATENT DOCUMENTS

| | | | |
|---|---|---|---|
| EP | 1979265 | 10/2008 | |
| WO | 2010/099908 | 9/2010 | |
| WO | 2012/100906 | 8/2012 | |
| WO | WO2012/139631 | * 10/2012 | ........ F01N 3/20 |
| WO | 2013/034575 | 3/2013 | |
| WO | 2015/052166 | 4/2015 | |

OTHER PUBLICATIONS

"ISO 22241-4, 2009, Diesel engines—N0x reduction agent AUS 32—refilling interface", International Standard Organisation, Geneva.
Search Report from corresponding PCT Appln. No. PCT/EP2015/061671, dated Aug. 18, 2015, English translation attached.

* cited by examiner

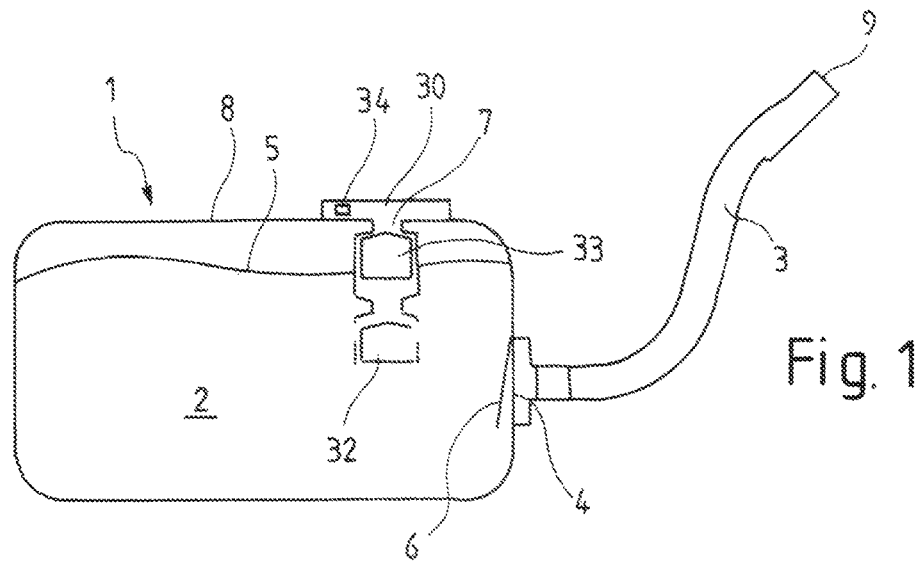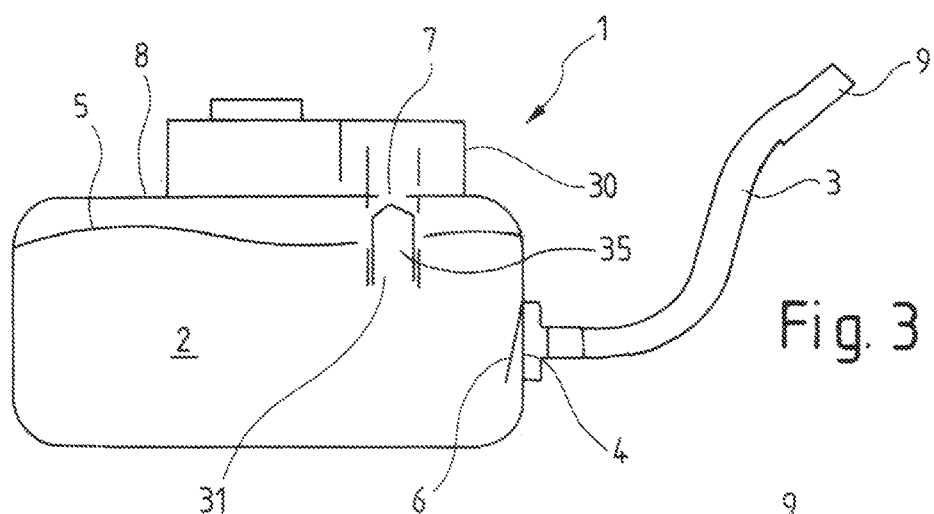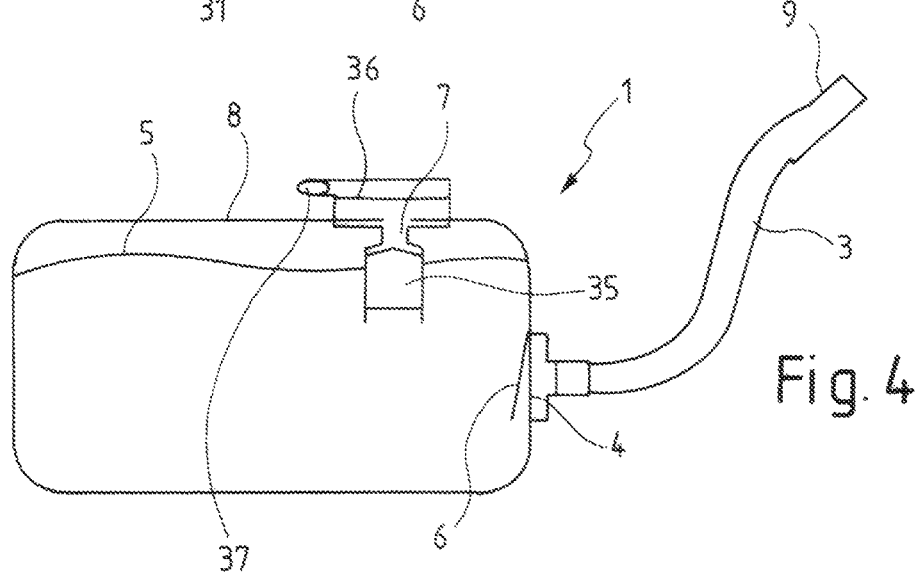

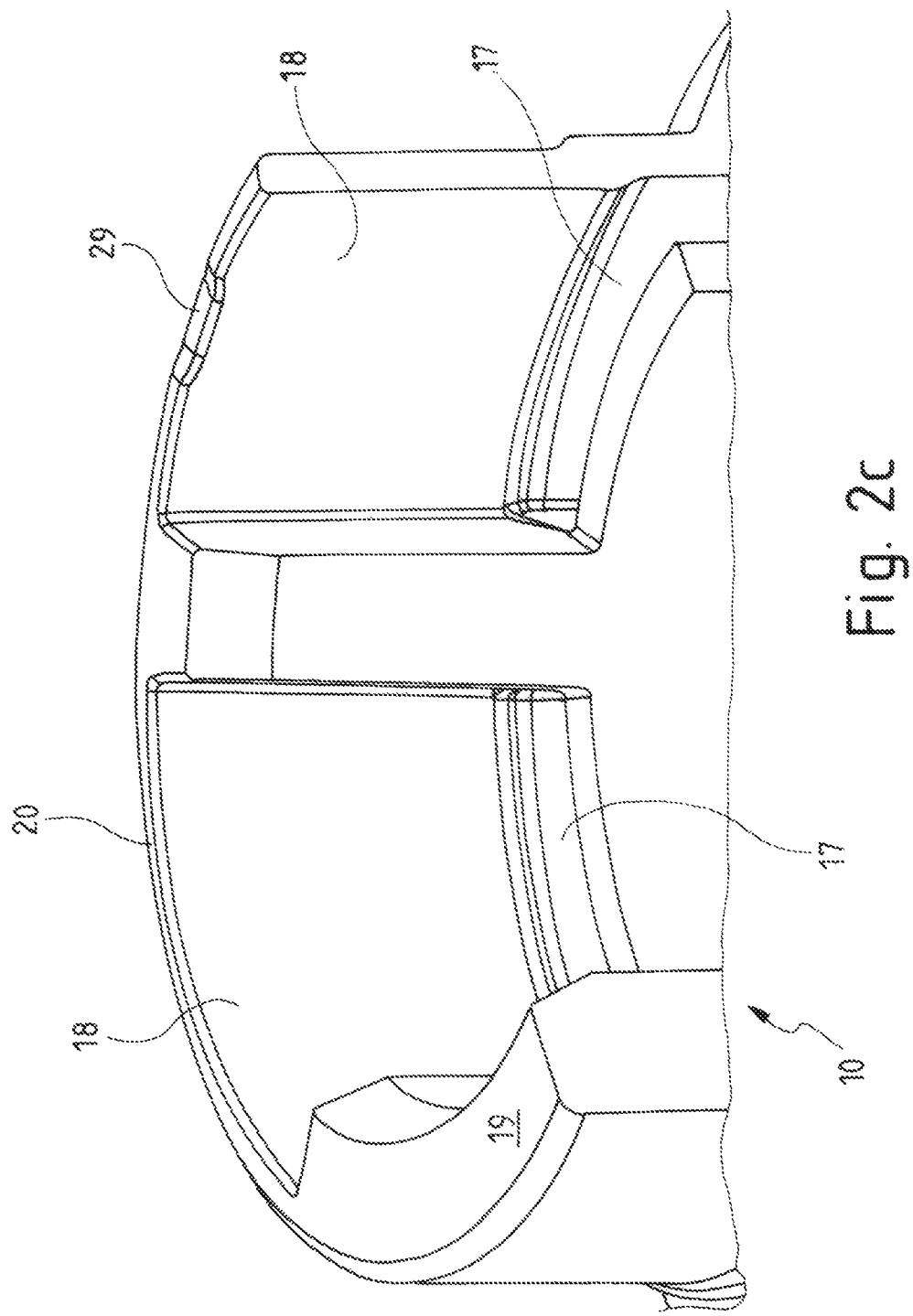

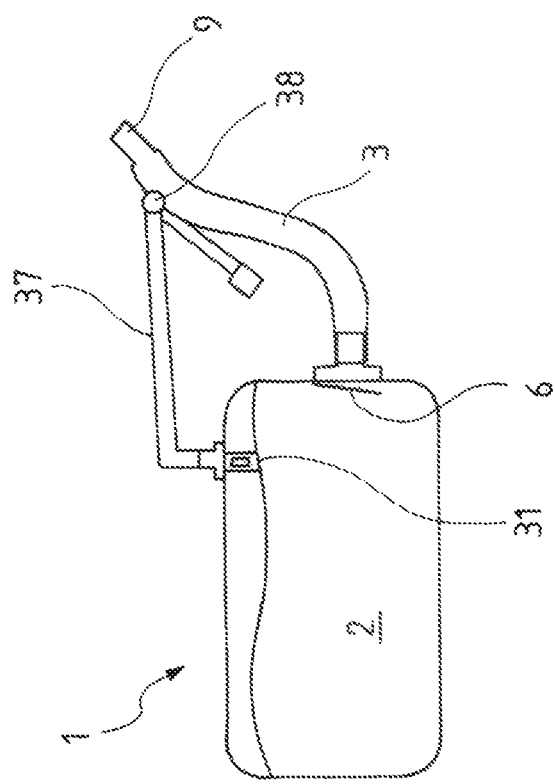

STORAGE TANK FOR AQUEOUS UREA SOLUTION IN A MOTOR VEHICLE

The invention relates to a storage container in a motor vehicle for receiving an aqueous urea solution for catalytic exhaust gas denitrification.

Catalytic exhaust gas denitrification using a urea solution, which is injected upstream of a catalytic converter into the exhaust tract of a diesel vehicle, is known in the field of diesel vehicles. This method is also referred to as the SCR (selective catalytic reduction) method. Urea solutions for catalytic reduction are known for example under the trade name "AdBlue". The composition of the urea solutions, and the requirements for their handling, transport and metering, are largely standardized, for example in the standards ISO 22241-1 and ISO 22241-3.

Efforts are also underway to standardize what are referred to as filling interfaces for urea containers.

Catalytic exhaust gas denitrification using aqueous urea has become accepted in particular in the context of passenger motor vehicles, wherein the size of the required storage container for the aqueous urea solution is dependent on the size of the motor vehicle. Depending on the size of the motor vehicle, the container can have a capacity of up to 40 liters. The container must be refilled every 15,000 to 30,000 km. Refilling can be carried out in a workshop, by workshop personnel, in the context of an inspection of the motor vehicle, although it is also possible for the user of the motor vehicle to refill the container.

In that context, it is known to fill the container either using a dispensing nozzle or from a pre-pack. So-called "Kruse bottles" have become accepted as pre-packs. These pre-packs make it possible to fill the storage container according to the so-called gas displacement method, that is to say that the pre-pack is screwed onto a filling connector of the storage container and then, by actuation of a corresponding inlet valve on the pre-pack, releases the liquid contained in the pre-pack, and in the process the gas volume flow displaced by the liquid flows into the pre-pack. A connection subassembly for connecting a filling container (starting container) to a storage container (target container) is known for example from EP 1 979 265 B1.

Filling using a filler container has the advantage that the ammonia vapors resulting from decomposition of the urea are not released during filling. A release of ammonia-containing vapors is associated with a relatively strong smell, and moreover inhalation of ammonia above certain concentrations is also harmful to health.

Commercially available filling bottles have relatively small volumes, and in the case of larger passenger motor vehicles it can be expedient to fill the storage container using a conventional pistol-grip nozzle. Since catalytic exhaust gas denitrification is long since established in the context of goods vehicles, the storage containers of goods vehicles are substantially larger and at many filling stations appropriate filling systems using pistol-grip nozzles are already present, it is most desirable to configure storage containers such that they can be filled both using a pre-pack and using a dispensing nozzle/pistol-grip nozzle.

In order to minimize the smell to which a user is exposed during filling using a dispensing nozzle, it is known to arrange a filling venting line of the storage container such that, as far as possible, it does not open to the atmosphere in the region of the filling opening of the storage container. For example, it is known to provide, on the storage container, a filling venting opening with a venting hose connected thereto, and to route the venting hose into a wheel arch or a wheel arch liner of the passenger motor vehicle.

In order to prevent direct return flow of the urea solution immediately after switching off the dispensing nozzle in the context of the filling procedure, it is furthermore known and expedient to provide a check flap on the filler pipe in the region of the opening of the filler pipe into the storage container.

Finally, in such a configuration, it is also expedient and generally provided that the filler pipe is connected to the storage container below the level of the liquid, that is to say below the surface. However, combining this design variant with a configuration in which the venting hose opens to the atmosphere at another point in the passenger motor vehicle can be achieved only by accepting substantial drawbacks. In this case, it is no longer possible to fill the storage container using a filling bottle operating according to the principle of the gas displacement method since this method assumes that air from the storage container will replace the liquid in the pre-pack. Such a pre-pack requires the air escaping from the storage container in order to release the liquid into the storage container.

The invention is therefore based on the object of providing a storage container in a motor vehicle for receiving an aqueous urea solution for catalytic exhaust gas denitrification, which is suitable both for filling using a pistol-grip nozzle and also for filling using an open pre-pack, and also for filling using filling bottles that operate according to the gas displacement method (Kruse bottles).

The invention is achieved with the features of claim 1; advantageous embodiments of the invention emerge from the subclaims.

One perspective of the invention relates to a storage container in a motor vehicle for receiving an aqueous urea solution for catalytic exhaust gas denitrification comprising a container body that encloses a storage volume for the urea solution, a filler pipe for filling the storage volume and means for venting the storage volume during filling, wherein the filler pipe has, at a remote end, a filler head, the filler head forms an orifice connector, the orifice connector has an orifice for receiving a dispensing nozzle and an external thread for receiving a matching union thread of a filling bottle for filling according to the gas displacement method, and for receiving a closure lid, and venting of the storage container is provided via a venting opening provided in a ceiling of the storage container.

Another perspective of the invention relates to a storage container in a motor vehicle for receiving an aqueous urea solution for catalytic exhaust gas denitrification comprising a container body that encloses a storage volume for the urea solution, comprising a filler pipe for filling the storage volume and means for venting the storage volume during filling, wherein the filler pipe has, at a remote end, a filler head, the filler head forms an orifice connector, the orifice connector has an orifice for receiving a dispensing nozzle and an external thread for receiving a matching union thread of a filling bottle for filling according to the gas displacement method, and for receiving a closure lid, and wherein the orifice connector has a closure lid seal or a closure lid sealing face that cooperates with a matching sealing face of the closure lid, wherein the orifice connector forms or has at least one secondary air opening which, when a filling bottle is connected, bridges a seal seat with the filling bottle.

The storage container in the sense of the present invention is installed in a fixed location in a motor vehicle, for example in a passenger motor vehicle. The container body and all other parts of the storage container can be made of thermoplastic polymer. For example, the container body can be made of thermoplastic polymer by extrusion blow molding or by injection molding. The filler pipe may but need not necessarily be integrally formed on the container body. A person skilled in the art will understand that the length and configuration of the filler pipe is governed essentially by the installation situation of the storage container.

Within the context of the invention, a filler head is to be understood essentially as the filling-side end of the filler pipe, which comprises the orifice connector and an external thread and the associated closure lid.

As the closure lid seal, provision can be made for example of a sealing disk provided in a base of the closure lid, which disk cooperates with an encircling end face of the orifice connector. Alternatively, provision can be made, as the closure lid seal, of an O-ring which extends in an external circumferential groove in the orifice connector, and which cooperates with a skirt, as a seal seat, of a closure lid formed as a closure cap.

Finally, the closure lid seal can also be formed by the external thread itself, which engages in a sealing manner in the corresponding mating thread of a closure lid formed as a closure cap.

The filler pipe of the storage container according to the invention can be designed such that it bridges a relatively large distance between a corresponding opening in the body of the motor vehicle and the storage container. Within the context of the invention, it is however also possible for the filler head to be designed as a filler pipe, that is to say that the filler head can be directly connected to a ceiling of the storage container.

In that respect, a fundamental concept of the invention can be summarized by stating that the orifice connector of the storage container or of the filler pipe is designed such that, when a filling bottle as starting container is connected to the storage container as target container, a targeted break in the seal is created such that the liquid flowing from the filling bottle into the storage container permits a secondary air draft or a secondary air flow from the environment into the filling bottle, wherein the secondary air stream is drawn below the union screw connection of the filling bottle into the filling bottle, such that in principle bottle filling is possible even when no container venting is provided at the filler head of the filler pipe, that is to say no gas exchange can take place between the storage container on one hand and the filling bottle on the other.

In this manner, it is in principle possible to configure the container venting independently of the requirements relating to bottle filling.

The filler head of the storage container according to the invention preferably comprises no filling venting line, or at least no filling venting opening.

In one preferred and expedient variant of the storage container according to the invention, it is provided that the secondary air opening is formed as a cutout or notch in an encircling end face of the orifice connector. Such a configuration is expedient especially when the closure lid seals on the outer circumference of the orifice connector, for example by means of a circumferential O-ring seal or by means of the external thread itself. In principle, however, it is also conceivable to choose the depth of a notch in the encircling end face of the orifice connector such that the notch creates a break in the seal of the system during bottle filling, but can still be closed by a sealing disk of appropriate tightness and flexibility in the base of the closure lid.

It is however provided, in the context of the storage container according to the invention, that a break in the seal of the system is created during bottle filling, wherein at the same time the integrity of the seal by means of the closure lid remains unaffected.

Alternatively, the secondary air opening can be formed as a bore or a cutout in a wall of the orifice connector. Preferably, the bore or the cutout extends radially with respect to an axis of symmetry of the orifice, that is to say radially in relation to a longitudinal central axis of the orifice.

One advantageous variant of the storage container according to the invention makes provision for a filling venting opening in a ceiling of the container body. The connection to the atmosphere can for example be provided directly in the region of the filling venting opening; alternatively, the filling venting opening can be connected to a filling venting line which opens to the atmosphere in a region of the motor vehicle that is remote from the filler head. For example, a filling venting line can be designed as a hose or a pipe that opens into a wheel arch or a wheel arch lining of the motor vehicle.

If the storage container is arranged for example in the engine bay of a motor vehicle, a bubble section or a drip tray, for example closed off from the atmosphere by a membrane, can be directly connected to the filling venting opening. The membrane can for example be hydrophobic and gas-permeable.

One advantageous variant of the storage container according to the invention provides that the filling venting line is guided via a switching valve which is provided on the filler head and, in a first, non-actuated switching position, closes the venting line and, in a second, actuated switching position, opens the venting line. In this variant of the storage container, the mouth of the venting line is expediently arranged remote from the filler head, for example the mouth can equally be routed into an engine bay of the motor vehicle or into a wheel arch or into a wheel arch lining of the motor vehicle.

Actuation of the switching valve is expediently effected by means of a dispensing nozzle.

For example, the switching valve can comprise a switching member that projects into a filler duct of the filler head and can be displaced mechanically by insertion of a dispensing nozzle such that the switching valve adopts the second, open switching position when the dispensing nozzle is inserted into the filler duct.

In an also advantageous variant of the storage container according to the invention, actuation of the switching valve can be effected via the closure lid or via the closure cap, wherein the closure lid, when closing the mouth of the orifice connector, acts on a spring-loaded switching member that is released when the closure lid is opened, such that the switching valve automatically adopts the second, open switching position.

Furthermore, in an advantageous variant of the storage container a fill level limiting valve that closes the venting opening can be provided. The fill level limiting valve can, in the simplest case, be designed as a dip pipe, but can also be provided as a float valve having one or more floats. In any case, it is advantageous if the float valve is also designed as a so-called "rollover" valve, that is to say comprises a float arranged in the storage container for switching off when the liquid level rises and, arranged above this, another float for gravity-actuated switch-off in the event of rollover. The second float, which is provided in order to close the venting path in the event of the vehicle rolling over, preferably closes in a leak-tight manner in order to prevent any egress of liquid.

Such a float, which serves to terminate filling, is preferably not designed to form a tight seal with the corresponding valve seat, in order to ensure that the filler pipe can empty after this termination procedure.

Furthermore, there can also be provided, in the region of the venting opening of the storage container, an upper part of the venting valve which defines a bubble volume, there being arranged a mushroom valve for overpressure and underpressure regulation in the storage container.

One preferred and expedient variant of the storage container according to the invention provides that the filler pipe is connected to the container body below a maximum permissible liquid level within the storage volume. Such a connection of the filler pipe to the container body is also referred to as subsurface, or a subsurface filling system.

An opening of the filler pipe into the container body can for example be closable by means of a check flap or any other type of check valve.

The invention will be explained below with reference to the appended drawings and in relation to an exemplary embodiment.

Figure 2B:
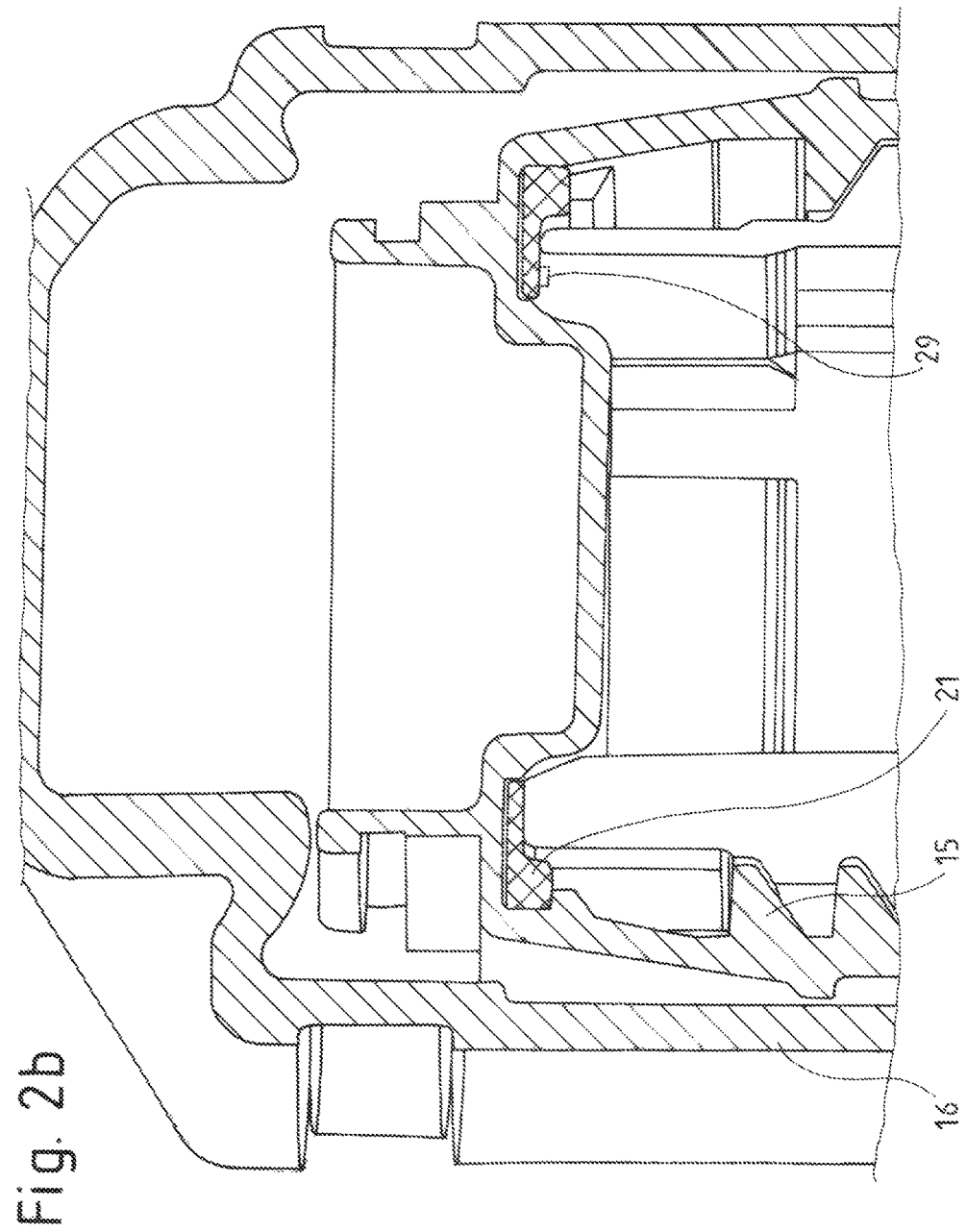
Figure 2D:
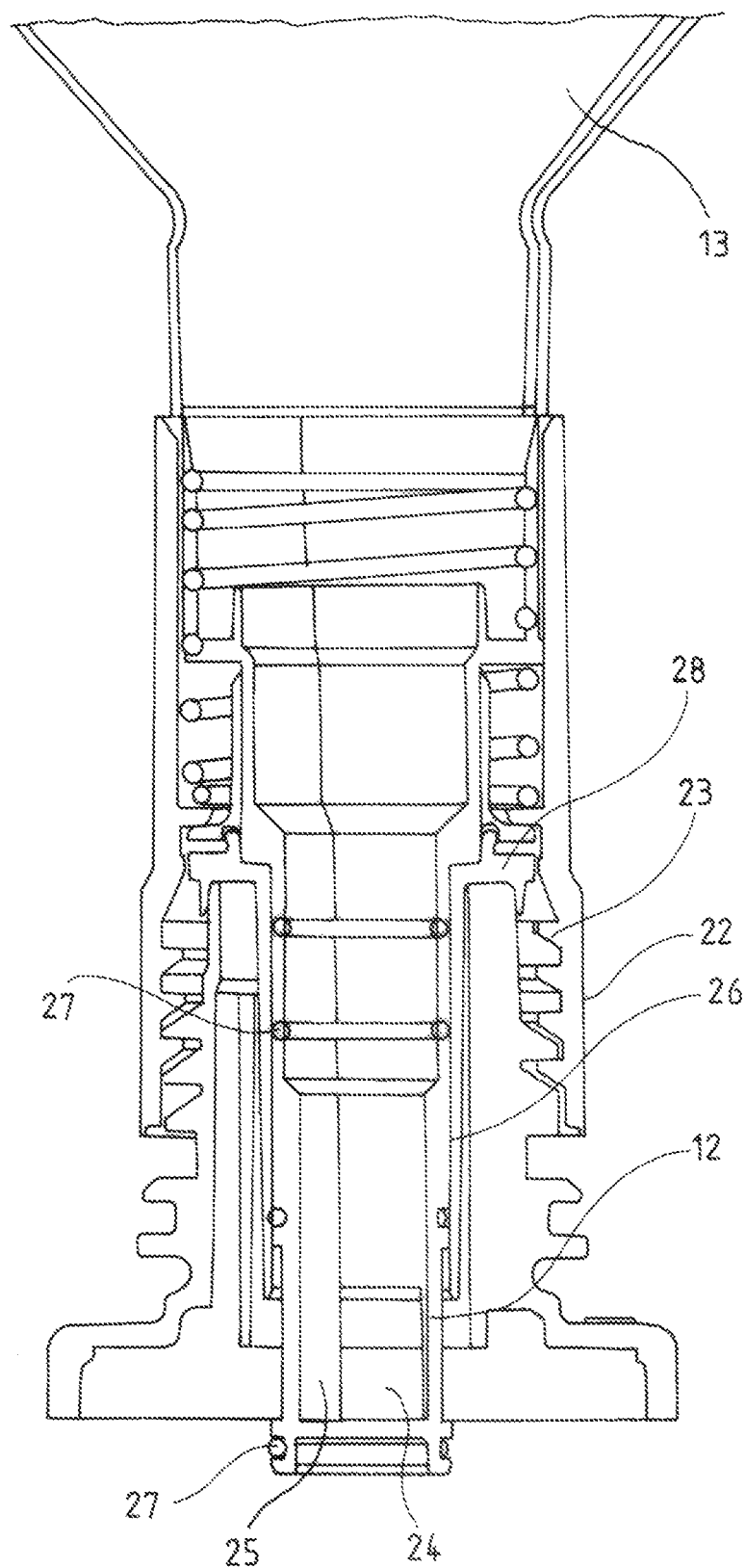
Figure 2E:
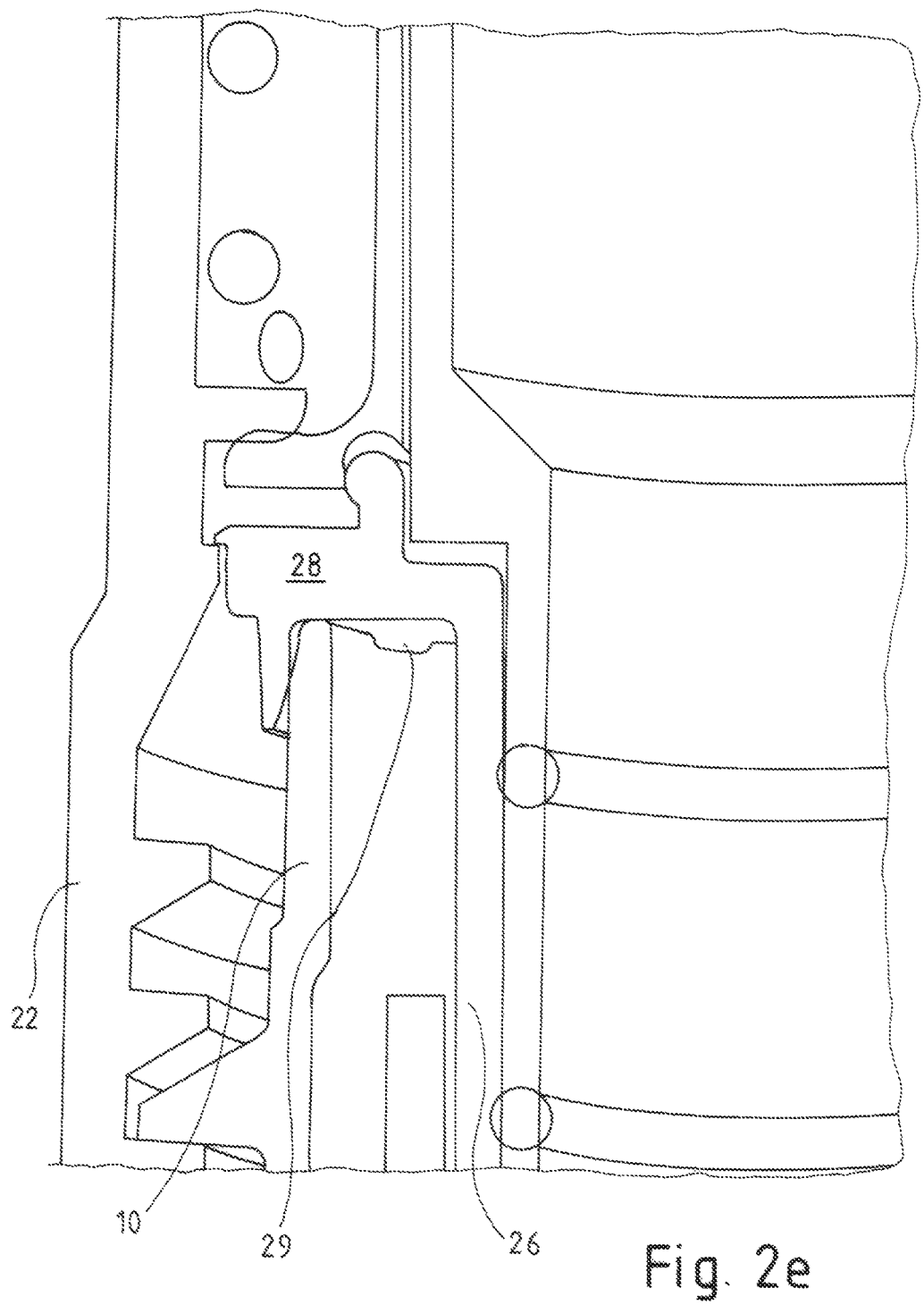

In the drawings:

FIG. 1: shows a schematic representation of a storage container according to the invention, FIG. 2a: shows a view of a filler head on a storage container according to the invention, FIG. 2b: shows a section view through the filler head represented in FIG. 2a, with screwed-on closure lid, FIG. 2c: shows an enlarged view of part of the orifice connector of the filler head, FIG. 2d: shows a section view through a filler head according to the invention, and through a filling bottle inserted into the filler head, FIG. 2e: shows an enlarged view of a detail of FIG. 2d, FIG. 3: shows a second variant of a storage container according to the invention, FIG. 4: shows a third variant of the storage container according to the invention, and FIG. 5: shows a fourth variant of the storage container according to the invention.

FIG. 1 shows a storage container 1 according to the invention for receiving an aqueous urea solution for catalytic exhaust gas denitrification. The storage container 1 is securely installed in a motor vehicle having a diesel engine.

The storage container 1 defines a storage volume 2 for receiving the aqueous urea solution. The storage container 1 further comprises a filler pipe 3 connected to the former below the surface, the filling opening 4 of which opens into the storage volume 2 below a maximum upper liquid level 5.

The filling opening 4 can be closed by means of a check flap 6. The check flap 6 can be opened by the inflowing liquid and closes the filling opening 4 in the event that the liquid within the storage volume suddenly flows backward.

The storage container 1 comprises a venting opening 7 in a ceiling 8.

In the proper installed position of the storage container 1, the ceiling 8 is arranged at the top.

In general, the terms top/bottom used in this application denote the orientation of the relevant part in the installed position.

The filler pipe 3 of the storage container 1 according to the invention comprises a filler head 9, which is represented by way of example in FIG. 2a.

As already mentioned in the introduction, the storage container 1 is preferably made of thermoplastic polymer.

The filler head 9 comprises an orifice connector 10 which defines an orifice 11 for receiving a dispensing valve (not shown), a funnel connector or a control cylinder 26 of a filling bottle 13.

The orifice connector 10 further comprises an external thread 14 which is designed to receive a closure lid 16 that is provided with an internal thread 15.

Parts of the closure lid 16, which is designed as a closure cap and engages around the external thread 14, are shown in FIG. 2b. The internal thread 15 of the closure lid 16 is designed as a union screw connection, and respectively forms, with the external thread 14 of the orifice connector 10, a union screw connection.

Further, the external thread 14 serves, as described below, to receive a matching union thread 23 of the filling bottle 13.

The drawings show various variants of the storage container 1 according to the invention. All of the variants share the feature that the filler head 9 has no venting opening in the region of the orifice 11. Each one of these variants of the storage container 1 according to the invention provides that venting of the storage container 1 takes place via the venting opening 7 provided in the ceiling 8 of the storage container 1. The venting volume flow, which is generated by the displacement of the gas volume within the storage container during filling of the latter, can escape to the atmosphere in the immediate vicinity of the venting opening, or alternatively this gas volume flow can be removed via a filling venting line 37 which opens to the atmosphere at another point in the motor vehicle. This will be discussed in greater detail below.

In any case, all of the variants of the storage container 1 according to the invention provide that the orifice connector 10 is designed such that it forms or has a secondary air opening, such that, in the case of filling using the filling bottle 13, there is formed a secondary air path from the atmosphere into the filling bottle 13, which path is in particular then charged with a secondary air flow when the liquid level 5 within the storage container 1 is above the filling opening 4, such that gas can no longer escape through the filler pipe 3 during filling. In this case, it is still possible for the liquid in the filling bottle 13 to enter the storage volume 2 via the filler pipe 3 or via a filling duct formed by the filler pipe 3, until the liquid level 5 raises a filling venting valve 31 that closes the venting opening 7.

One possible configuration of such a secondary air opening is illustrated by way of example in FIG. 2c, in which the secondary air opening is formed as a cutout 18 in an encircling end face 19 of the orifice connector 10.

FIG. 2c shows a partially cutaway internal view of the orifice connector 10. The orifice connector 10 comprises, internally, venting ducts 17 that form for venting the storage volume 2 in the event of filling by means of a dispensing nozzle. The dispensing nozzle, or pistol-grip nozzle, is enclosed and guided inside the orifice connector 10 by the internal circumferential wall of the latter, wherein the gas volume displaced during filling can escape via the venting ducts 17 and via regions of reduced wall thickness 18 of the enclosing wall of the orifice connector 10. As can also be seen in FIG. 2c, in the regions of reduced wall thickness 18 there remains a reduced residual end face 20 of the orifice connector 10.

Reference numeral 29 refers to a notch or recess in the residual end face 20 of the orifice connector 10, which forms the previously mentioned secondary air opening. At this point, it can be noted that the view of the orifice connector 10 in FIG. 2e is rotated through 90° with respect to the view in FIG. 2c, such that in that figure the notch 29 is arranged on the left-hand side of the illustration.

The end face 19 of the orifice connector 10 bears in a sealing manner against an elastic seal 21 in the closure lid 16 when the closure lid is screwed on. In that regard, reference is made to FIG. 2b.

The elastic seal 21 can for example take the form of an elastomer ring having a flat, approximately rectangular profile. When the closure lid 16 is securely closed, the elastic seal 21 fills the notch 29 such that the closure lid 16 hermetically seals the storage volume 2 with respect to the atmosphere. For reasons of clarity, however, the notch 29 is visible in FIG. 2b, that is to say that the figure shows the elastic seal 21 in the non-deformed state. As shown in FIG. 2b, the elastic seal 21 can have a stepped profile on its side facing the orifice connector 10, although it will be obvious to a person skilled in the art that the elastic seal 21 can also have a simple rectangular profile.

Reference is now made to FIGS. 2d and 2e, which show the filling state of the storage container 1 with the filling bottle 13 inserted into the orifice connector 10.

With regard to the operation of the filling bottle 13, and also for disclosure purposes, reference is expressly made to EP 1 979 265 B1.

The filling bottle 13 comprises a sleeve connector 22 which, by means of a union thread 23, is screwed onto the external thread 14 of the office connector 10. In the non-actuated state, the sleeve connector 22 covers an outlet cylinder 12 that encloses a filling duct 24 and a venting duct 25. The outlet cylinder 12 is sealed circumferentially with respect to a control cylinder 26, wherein the control cylinder 26 is guided displaceably in the outlet cylinder 12 and, in the closed position (not shown), the outlet cylinder 12 is sealed with respect to the control cylinder 26 by means of two sealing rings 27. By means of pressure on the filling bottle 13 in the axial direction, displacement of the outlet cylinder 12 counter to the control cylinder 26 will open an outlet opening of the filling duct 24, such that aqueous urea solution can now flow via the filling duct 24 from the filling bottle 13 into the storage volume 2 of the storage container 1. Conversely, gas from the storage volume 2 can rise through the venting duct into the filling bottle 13.

In principle, the union thread 23 is not connected in a sealing manner to the orifice connector 10, a seal is established by the end face 19 of the orifice connector 10, which bears against a collar-shaped seal seat 28 of the control cylinder 26.

As shown in the enlarged view of FIG. 2e, the notch 29 in the residual end face 20, forms together with the collar-shaped seal seat 28 of the control cylinder 26, an opening which as secondary air opening creates a break in the seal of the system such that, when the liquid level 5 within the storage container 1 rises, a venting path is created from the atmosphere between the sleeve connection 22 and the external thread of the orifice connector 10.

As shown in particular in the enlarged view in FIG. 2b, which shows the orifice connector 10 with attached closure lid 16, when the storage container 1 is closed the residual end face 20 bears against the elastic seal 21 in the closure lid 16, such that the notch 29 does not harm the integrity of the elastic seal 21 in the closure lid 16 when the closure lid 16 is fitted.

As already mentioned in the introduction, it is also possible to provide, as an alternative to the notch 29 in the residual end face 20 of the orifice connector, a radial bore or a window in the enclosing wall of the orifice connector 10.

Reference is now made to the variants of the storage container 1 as shown in FIGS. 1, 3, 4 and 5.

In the variant of the storage container 1 according to the invention shown in FIG. 1, the venting opening 7 is arranged in the ceiling of the storage container 1, in an upper part 30 of a filling venting valve 31. The filling venting valve 31 comprises a first, lower float 32 and a second, upper float 33, wherein the first, lower float 32 does not hermetically close the venting opening 7 and serves for terminating filling, and the second, upper float 33, as a "rollover" valve, completely closes the venting opening 7 in the event of the vehicle rolling over.

In the upper part 30 of the filling venting valve, which is arranged on the outside of the storage container 1, there is also arranged a mushroom valve 34 which permits pressure equalization between the storage volume 2 and the atmosphere in the event of either overpressure or underpressure within the storage container 1.

In the case of the storage container 1 as shown in FIG. 3, in which identical components are provided with identical reference signs, the upper part 30 of the filling venting valve 31 is designed as a liquid trap or as a bubble section.

The filling venting valve comprises only one float 35.

The upper part 30, designed as a liquid trap, of the filling venting valve 31 can equally comprise a mushroom valve or also a semi-permeable membrane or a filter (filter mesh or filter grid or filter fleece), which establishes the pressure equalization with the atmosphere. Of course, the upper part 30, designed as a liquid trap, of the filling venting valve 31 can also comprise combinations of the above-mentioned elements (mushroom valve, semi-permeable membrane, filter, etc.). It is also possible, to shield with respect to the atmosphere, to provide in the upper part 30 a labyrinth, which can equally comprise a mushroom valve, a semi permeable membrane, a filter, a fly screen or the like.

In the case of the variant, shown in FIG. 4, of the storage container 1 according to the invention, in which also identical components are provided with identical reference signs, the upper part 30 of the filling venting valve 31, which also has just one float 35, is provided with a semi-permeable membrane 36 that extends between the venting opening 7 and a connection to a filling venting line 37. The membrane is impermeable to liquid but permeable to air.

The filling venting line 37, which is represented only by way of indication, is routed to a remote point of the motor vehicle, for example to a wheel arch.

In the case of the variants of the storage container 1 that are shown in FIGS. 3 and 4, the float 35 is designed with forced leakage, that is to say that it is not pressed into the associated seal seat in a hermetically closing manner, such that after a termination procedure, liquid remaining in the filler pipe 3 can slowly drain into the storage volume 2.

This is also the case for the first, lower float 32 in the variant of the storage container 1 shown in FIG. 1.

Another variant of the storage container 1 according to the invention is shown, by way of example, in FIG. 5. Here, too, identical components are provided with identical reference signs. In that figure, a filling venting line 37 is connected to the exterior of the filling venting valve 31, and is routed via the filler head 9 to a remote location on the motor vehicle. At the filler head 9, there is provided a switching valve 38 which for example comprises a switching tappet (not shown) that projects into the filling duct of the orifice connector 10. This switching tablet can be actuated by a dispensing nozzle and, in the actuated state, opens a venting path in the venting line 37 to the atmosphere, the venting line 37 being again closed after removal of the dispensing nozzle from the filler head 9.

LIST OF REFERENCE SIGNS

1 Storage container
2 Storage volume
3 Filler pipe
4 Filling opening
5 Liquid level
6 Check flap
7 Venting opening
8 Ceiling
9 Filler head
10 Orifice connector
11 Orifice
12 Outlet cylinder
13 Filling bottle
14 External thread
15 Internal thread of the closure lid
16 Closure lid
17 Venting ducts
18 Regions of reduced wall thickness
19 End face
20 Residual end face
21 Elastic seal
22 Sleeve connection
23 Union thread
24 Filling duct
25 Venting duct
26 Control cylinder
27 Sealing ring
28 Collar-shaped seal seat
29 Notch
30 Upper part of the filling venting valve
31 Filling venting valve
32 First, lower float
33 Second, upper float
34 Mushroom valve
35 Float
36 Membrane
37 Filling venting line
38 Switching valve

What is claimed is:

1. A storage container in a motor vehicle to receive an aqueous urea solution for catalytic exhaust gas denitrification comprising:
a container body that encloses a storage volume for the urea solution, a filler pipe for filling the storage volume and a vent for venting the storage volume during filling, wherein the filler pipe has, at a remote end, a filler head, the filler head forms an orifice connector, the orifice connector has an orifice for receiving a dispensing nozzle, the filler head of the storage container has no venting opening in the region of the orifice and wherein venting of the storage container is provided via a venting opening provided in a ceiling of the storage container, wherein the orifice connector has an external thread for receiving a matching union thread of a filling bottle for filling according to the gas displacement method, and for receiving a closure lid, in that the orifice connector has at least one of a closure lid seal and a closure lid sealing face that cooperates with a matching sealing face of the closure lid, and in that the orifice connector comprises at least one secondary air opening which, when a filling bottle is connected, bridges a seal seat which is at least one of provided with and located on the filling bottle, and which forms a secondary air path from the atmosphere into the filling bottle.

2. The storage container as claimed in claim 1, wherein the secondary air opening is formed as a cutout in an encircling end face of the orifice connector.

3. The storage container as claimed in claim 1, wherein the secondary air opening is formed as a cutout running radially with respect to an axis of symmetry of the orifice.

4. The storage container as claimed in claim 1, wherein the filling venting opening is connected to a filling venting line which opens to the atmosphere in a region of the motor vehicle that is remote from the filler head.

5. The storage container as claimed in claim 1, wherein the filling venting line is guided via a switching valve which is provided on the filler head and, in a first switching position, closes the filling venting line and, in a second switching position, opens the filling venting line.

6. The storage container as claimed in claim 5, wherein the switching valve comprises a switching member that projects into a filler duct of the filler head and can be displaced by insertion of a dispensing nozzle such that the switching valve adopts the second switching position when the dispensing nozzle is inserted into the filler duct.

7. The storage container as claimed in claim 5, wherein the switching valve comprises a switching member which is held by the closure lid in the first, non-actuated switching position, and, when the closure lid is removed, releases the switching member such that the switching valve adopts the second switching position in which the filling venting line is open.

8. The storage container as claimed in claim 1, wherein a filling venting valve that closes the venting opening is provided as a fill level limiting valve.

9. The storage container as claimed in claim 1, wherein the filler pipe is connected to the container body below a maximum permissible liquid level within the storage volume.

10. The storage container as claimed in claim 1, wherein the secondary air opening is formed as a recess in an encircling end face of the orifice connector.

11. The storage container as claimed in claim 1, wherein the secondary air opening is formed as a notch in an encircling end face of the orifice connector.

12. The storage container as claimed in claim 1, wherein the secondary air opening is formed as a radial bore in a wall of the orifice connector.

* * * * *